United States Patent
McHugh et al.

(10) Patent No.: US 9,607,119 B1
(45) Date of Patent: *Mar. 28, 2017

(54) SIMULATING EFFECTS OF TEMPERATURE ON ACOUSTIC MICROWAVE FILTERS

(71) Applicant: RESONANT INC., Santa Barbara, CA (US)

(72) Inventors: Sean McHugh, Santa Barbara, CA (US); Neal O. Fenzi, Santa Barbara, CA (US)

(73) Assignee: RESONANT INC., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,510

(22) Filed: Jun. 29, 2016

Related U.S. Application Data

(63) Continuation of application No. 14/941,462, filed on Nov. 13, 2015, now Pat. No. 9,405,875.

(51) Int. Cl.
   *G06F 17/50* (2006.01)

(52) U.S. Cl.
   CPC ...... *G06F 17/5045* (2013.01); *G06F 17/5009* (2013.01); *G06F 17/504* (2013.01);
   (Continued)

(58) Field of Classification Search
   None
   See application file for complete search history.

(56) References Cited

U.S. PATENT DOCUMENTS

| 6,342,823 B1 | 1/2002 | Dansky et al. |
| 6,885,260 B2 | 4/2005 | Nishimura et al. |

(Continued)

OTHER PUBLICATIONS

S. Zhgoon et al., "Modeling of Electromagnetic and Acoustical Properties of RF SAW Filters from On-Chip Layout Including all Electrodes and Comparison with Experimental Data," 2004 IEEE Int'l Ultrasonics, Ferroelectrics, and Frequency Control Joint 50$^{th}$ Anniversary Conference, pp. 1914-1917.*

(Continued)

*Primary Examiner* — Leigh Garbowski
(74) *Attorney, Agent, or Firm* — Vista IP Law Group LLP

(57) ABSTRACT

A method of designing an acoustic microwave filter comprises generating a proposed filter circuit design having an acoustic resonant element with a defined admittance value, introducing a lumped capacitive element in parallel and a lumped inductive element in series with the resonant element, selecting a first capacitance value for the capacitive element and a first inductance value for the inductive element, thereby creating a first temperature modeled filter circuit design, simulating the first temperature modeled filter circuit design at a first operating temperature, thereby generating a first frequency response, selecting a second capacitance value for the capacitive element and a second inductance value for the inductive element, thereby creating a second temperature modeled filter circuit design, simulating the second temperature modeled filter circuit design at a second operating temperature, thereby generating a second frequency response, and comparing the first and second frequency responses to the frequency response requirements.

22 Claims, 10 Drawing Sheets

(52) U.S. Cl.
CPC ...... *G06F 17/5036* (2013.01); *G06F 2217/16* (2013.01); *G06F 2217/80* (2013.01)

(56) References Cited

U.S. PATENT DOCUMENTS

| | | |
|---|---|---|
| 6,909,338 B2 | 6/2005 | Omote |
| 8,701,065 B1 | 4/2014 | Silver et al. |
| 8,751,993 B1 | 6/2014 | Fenzi et al. |
| 9,038,005 B2 | 5/2015 | Turner et al. |
| 2009/0201103 A1 | 8/2009 | Watanabe |

OTHER PUBLICATIONS

J.D. Larson III et al., "Modified Butterworth-Van Dyke Circuit for FBAR Resonators and Automated Measurement System," 2000 IEEE Untrasonics Symposium, pp. 863-868.*

N.O. Fenzi et al., "Multimode Bandpass SAW filter using Reconfigurable Resonance Technology," 2010 IEEE Int'l Ultrasonics Symposium Proceedings, pp. 864-867.*

Hammond, Using Infinite Synthesized Networks (ISN) design techniques to create RF filters, EDN Network, Sep. 2015 (13 pages).

Hoft et al., Design of Symmetric Trisection Filters for Compact Low-Temperature Co-Fired Ceramic Realization, IEEE Trans. on Microwave Theory and Techniques, vol. 58, No. 1, Jan. 2010, pp. 165-175.

Lee et al., Design and Diagnosis of Wideband Coupled-Resonator Bandpass Filter, IEEE Trans. on Microwave Theory and Techniques, vol. 60, No. 5, May 2012, pp. 1266-1277.

Loseu et al., Improvement of Balance Performance in LSAW Filters Based on 5-IDT Multi-Mode Structure, 2007 IEEE Ultrasonics Symposium, pp. 2363-2366.

Loseu et al., Novel LSAW DMS filter structure for narrow duplex gap SE->Bal RX filter application, 2010 IEEE International Ultrasonics Symposium Proceedings, pp. 1258-1262.

Pitschi et al., Accurate Modeling and Simulation of SAW RF Filters, 2003 IEEE MMT-S Digest, pp. 2009-2012.

Turalchuk et al., Modelling of Tunable Bulk Acoustic Resonators and Filters with Induced Piezoelectric Effects in BSTO Film in a Wide Temperature Range, Microwave Microelectronics Laboratory, 2009 IEEE, pp. 64-69.

Zhu et al., Characterization of Finite-Ground CPW Reactive Series-Connected Elements for Innovatice Design of Unilanar M(H)MICs, IEEE Trans. on Microwave Theory and Techniques, vol. 50, No. 2, Feb. 2002, pp. 549-557.

Loseu et al., Design Over Temperature—new approach to improve LSAW filters thermo stability, 2010 IEEE International Ultrasonics Symposium Proceedings, pp. 1302-1306.

Van Dyke, Piezo-Electric Resonator and its Equivalent Network Proc. IRE, vol. 16, 1928, pp. 742-764.

* cited by examiner

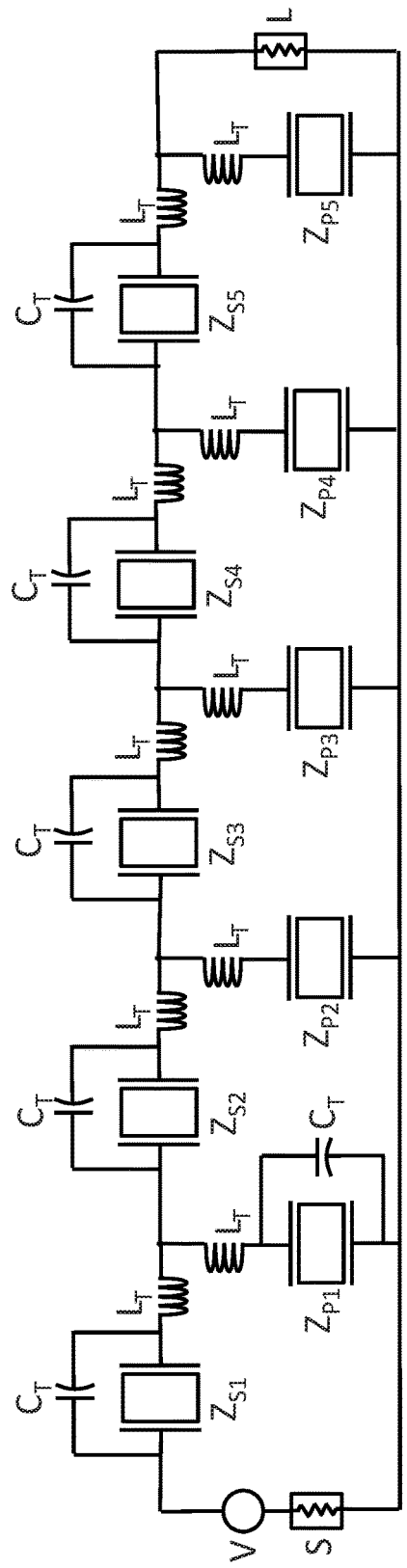

SIMULATING EFFECTS OF TEMPERATURE ON ACOUSTIC MICROWAVE FILTERS

RELATED APPLICATION DATA

The present application is continuation of U.S. patent application Ser. No. 14/941,462, filed Nov. 13, 2015. The foregoing application is hereby incorporated by reference into the present application in its entirety.

FIELD OF THE INVENTION

The present inventions generally relate to microwave filters, and more particularly, to acoustic microwave filters designed for narrow-band applications.

BACKGROUND OF THE INVENTION

Electrical filters have long been used in the processing of electrical signals. In particular, such electrical filters are used to select desired electrical signal frequencies from an input signal by passing the desired signal frequencies, while blocking or attenuating other undesirable electrical signal frequencies. Filters may be classified in some general categories that include low-pass filters, high-pass filters, band-pass filters, and band-stop filters, indicative of the type of frequencies that are selectively passed by the filter. Further, filters can be classified by type, such as Butterworth, Chebyshev, Inverse Chebyshev, and Elliptic, indicative of the type of bandshape frequency response (frequency cutoff characteristics) the filter provides relative to the ideal frequency response.

The type of filter used often depends upon the intended use. In communications applications, band pass and band stop filters are conventionally used in cellular base stations, cell phone handsets, and other telecommunications equipment to filter out or block RF signals in all but one or more predefined bands. Of most particular importance is the frequency range from approximately 500-3,500 MHz. In the United States, there are a number of standard bands used for cellular communications. These include Band 2 (~1800-1900 MHz), Band 4 (~1700-2100 MHz), Band 5 (~800-900 MHz), Band 13 (~700-800 MHz), and Band 17 (~700-800 MHz); with other bands emerging.

Microwave filters are generally built using two circuit building blocks: a plurality of resonators, which store energy very efficiently at a resonant frequency (which may be a fundamental resonant frequency $f_0$ or any one of a variety of higher order resonant frequencies $f_1$-$f_n$); and couplings, which couple electromagnetic energy between the resonators to form multiple reflection zeros providing a broader spectral response. For example, a four-resonator filter may include four reflection zeros. The strength of a given coupling is determined by its reactance (i.e., inductance and/or capacitance). The relative strengths of the couplings determine the filter shape, and the topology of the couplings determines whether the filter performs a band-pass or a band-stop function. The resonant frequency $f_0$ is largely determined by the inductance and capacitance of the respective resonator. For conventional filter designs, the frequency at which the filter is active is determined by the resonant frequencies of the resonators that make up the filter. Each resonator must have very low internal resistance to enable the response of the filter to be sharp and highly selective for the reasons discussed above. This requirement for low resistance tends to drive the size and cost of the resonators for a given technology.

The duplexer, a specialized kind of filter is a key component in the front-end of mobile devices. Modern mobile communications devices transmit and receive at the same time (using LTE, WCDMA or CDMA) and use the same antenna. The duplexer separates the transmit signal, which can be up to 0.5 Watt power, from the receive signal, which can be as low as a pico-Watt. The transmit and receive signals are modulated on carriers at different frequencies allowing the duplexer to select them. The duplexer must provide the frequency selection, isolation and low insertion loss in a very small size often only about two millimeters square.

The front-end receive filter preferably takes the form of a sharply defined band-pass filter to eliminate various adverse effects resulting from strong interfering signals at frequencies near the desired received signal frequency. Because of the location of the front-end receiver filter at the antenna input, the insertion loss must be very low so as to not degrade the noise figure. In most filter technologies, achieving a low insertion loss requires a corresponding compromise in filter steepness or selectivity.

In practice, most filters for cell phone handsets are constructed using acoustic resonator technology, such as surface acoustic wave (SAW), bulk acoustic wave (BAW), and film bulk acoustic resonator (FBAR) technologies. The acoustic resonator has two resonances closely spaced in frequency call the "resonance" frequency and the "anti-resonance" frequency (see K. S. Van Dyke, Piezo-Electric Resonator and its Equivalent Network Proc. IRE, Vol. 16, 1928, pp. 742-764). Such acoustic resonators have the advantages of low insertion loss (on the order of 1 dB at the center frequency), compact size, and low cost compared to equivalent inductor/capacitor resonators. For this reason, acoustic resonator implementations are often used for microwave filtering applications in the front-end receive filter of mobile devices. Acoustic resonators are typically arranged in a ladder topology (alternating series and shunt resonators) in order to create band pass filters. Acoustic ladder filters have been very successful for handset applications, with more than a billion units currently sold each year.

The design of modern microwave filters with acoustic resonators requires detailed models to predict the frequency response of the filter. The customary approach is to build an elaborate phenomenological model using all geometrical aspects of each resonator, e.g., pitch, aperture, length, etc. Because commercial acoustic microwave filters must be able to comply with performance requirements over a broad range of temperatures, it is important to be able to model the performance of an acoustic microwave filter design over a relevant temperature range, so that the filter design can be optimized to ensure that, when fabricated, it complies with the performance requirements over that temperature range. Thus, without an accurate model of the acoustic filter for the effects of temperature, the acoustic filter cannot be designed or optimized consistently.

The simplest and most common approach to accurately model an acoustic filter over a temperature range is to uniformly shift the filter response across the entire frequency range by an amount proportional to the temperature. However, measurements of acoustic microwave filters show that this approach neglects the critical fact that the resonant and anti-resonant frequencies shift by different amounts for a given temperature change. When constructed as part of a filter, this not only leads to the center frequency of the passband changing, but also the width of the passband changing. In particular, the change in the resonant frequencies of all the resonators moves the lower-frequency edge of the filter, while the change in the anti-resonant frequencies of all the resonators moves the higher-frequency edge of the filter, but at disproportionate amounts to the resonant frequencies.

For example, referring to FIG. 1, the frequency response of an acoustic microwave filter was measured at −20° C. (dotted line), 25° C. (solid line), and 100° C. (dashed line). As shown, the passband tends to shift to lower frequencies as the temperature increases. Referring now to FIG. 2, the frequency responses of an actual acoustic microwave filter measured at −20° C. and 100° C. (solid lines) can be compared to simulated frequency responses of a corresponding acoustic microwave filter design that have been proportionally shifted in accordance with the two temperatures (dashed lines). It can be readily seen that, when the left sides of the passbands of the simulated frequency responses at −20° C. and 100° C. are respectively aligned with the left sides of the passbands of the actual frequency responses at −20° C. and 100° C., the right sides of the passbands are not aligned, evidencing the fact that the passband not only shifts as the temperature changes, the passband also distorts as the temperature changes. Therefore, this simple approach incorrectly predicts a bandwidth unchanged by temperature.

A more sophisticated approach to modeling the effects of temperature is to characterize the individual resonators that make up a filter over a range of temperatures. Each model uses a certain number of parameters, which will vary with temperature. Using basic physical knowledge, one can predict how each of these parameters will change as the temperature changes. The response of the resonator is captured with a sort of analytical model, e.g., Butterworth-van Dyke or Coupling-of-Modes (see A. Loseu and J. Rao, 2010 IEEE International Ultrasonics Symposium Proceedings, pp. 1302-1306). However, with as many parameters as are afforded in such a model, it is difficult to find a consistently predictive model. In addition, the construction of such a model is time consuming and onerous. Furthermore, the model may even be misleading, since the important frequency response of each resonator depends sensitively on the surrounding elements when embedded in a filter. Thus, the primary difficulty with this sophisticated method is the faithful translation of the isolated resonator measurements to the same resonator's response once embedded in a filter or duplexer.

There, thus, remains a need to provide an improved method for modeling acoustic microwave filters over a temperature range.

SUMMARY OF THE INVENTION

In accordance with the present inventions, a method of designing an acoustic microwave filter in accordance with frequency response requirements is provided. The frequency response requirements may comprise, e.g., one or more of a frequency dependent return loss, insertion loss, rejection, and linearity. The frequency response requirements may comprise a pass band, e.g., in the 300 MHz to 300 GHz range, specifically in the 300 MHz to 10.0 GHz, and more specifically in the 500-3500 MHz range.

The method comprises generating a proposed filter circuit design having a plurality of circuit elements comprising an acoustic resonant element having a defined admittance value. The acoustic resonant element may be, e.g., one of a surface acoustic wave (SAW) resonator, a bulk acoustic wave (BAW) resonator, a film bulk acoustic resonator (FBAR), and a microelectromechanical system (MEMS) resonator. The acoustic resonator may, e.g., be modeled as a Butterworth-Van Dyke (BVD) model, as a Coupling of Modes (COM) model, or a Finite Element Model (FEM). The proposed filter circuit design may have, e.g., an Nth order ladder topology.

The method further comprises introducing a lumped capacitive element in parallel and a lumped inductive element in series with the resonant element. The method further comprises selecting a first capacitance value for the capacitive element and a first inductance value for the inductive element, thereby creating a first temperature modeled filter circuit design that shifts the defined admittance value of the resonant element to a first admittance value, and simulating the first temperature modeled filter circuit design at a first operating temperature, thereby generating a first frequency response. The method further comprises selecting a second capacitance value for the capacitive element and a second inductance value for the inductive element, thereby creating a second temperature modeled filter circuit design that shifts the defined admittance value of the resonant element to a second admittance value different from the first admittance value, and simulating the second temperature modeled filter circuit design at a second operating temperature, thereby generating a second frequency response. The first and second capacitance values may be, e.g., in the range of −40 pF-40 pF, and the first and second inductance values may be, .e.g., in the range of −10 nH-10 nH. An optional method further comprises optimizing the proposed filter circuit design, in which case, the lumped capacitive element and lumped inductive element are introduced into the proposed optimized filter circuit design. The method further comprises comparing the first and second frequency responses to the frequency response requirements, and constructing the acoustic microwave filter from the proposed filter circuit design based on the comparison.

In one embodiment, the first capacitance value and the first inductance value are computed as functions of the first operating temperature, and the second capacitance value and the second inductance value are computed as functions of the second operating temperature. For example, the first capacitance value may be selected to be equal to the product of a first scaling factor, the area of the resonant element of the proposed filter circuit design, and the difference between the first operating temperature and a baseline temperature; the second capacitance value may be selected to be equal to the product of the first scaling factor, the area of the resonant element of the proposed filter circuit design, and the difference between the second operating temperature and the baseline temperature; the first inductance value may be selected to be equal to the product of a second scaling factor and the difference between the first operating temperature and the baseline temperature; and the second inductance value may be selected to be equal to the product of the second scaling factor and the difference between the second operating temperature and the baseline temperature.

The scaling factors may be determined in any one of a variety of manners. For example, a reference filter circuit design having a plurality of circuit elements comprising a reference acoustic resonant element can be generated, and a reference acoustic microwave filter from the reference filter circuit design can be constructed. The reference resonant element is composed of the same material as the resonant element of the proposed filter circuit design. A reference frequency response of the reference acoustic microwave filter can be measured at a reference operating temperature, and each of the first and second scaling factors can be computed based on the reference frequency response.

For example, a lumped reference capacitive element can be introduced in parallel and a lumped reference inductive element in series with the reference resonant element, and selecting a reference capacitance value for the lumped reference capacitive element and a reference inductance value for the lumped reference inductive element, thereby generating a temperature modeled reference filter circuit design. The temperature modeled reference filter circuit design can then simulated at the reference operating temperature while changing the reference capacitance value and the reference inductance value until a frequency response of the simulated reference filter circuit design matches the measured frequency response of the temperature modeled reference acoustic microwave filter at the reference operating temperature, thereby arriving at a final reference capacitance value and a final reference inductance value. The first scaling factor may equal the final reference capacitance value divided by the product of the area of the reference resonant element and the difference between the reference operating temperature and the baseline operating temperature, and the second scaling factor may equal the final reference inductance value divided by the difference between the reference operating temperature and the baseline operating temperature.

Other and further aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 10 is a schematic diagram illustrating a temperature modeled acoustic filter circuit design using the acoustic resonator of FIG. 8;

DETAILED DESCRIPTION OF THE EMBODIMENTS

Figure 1:
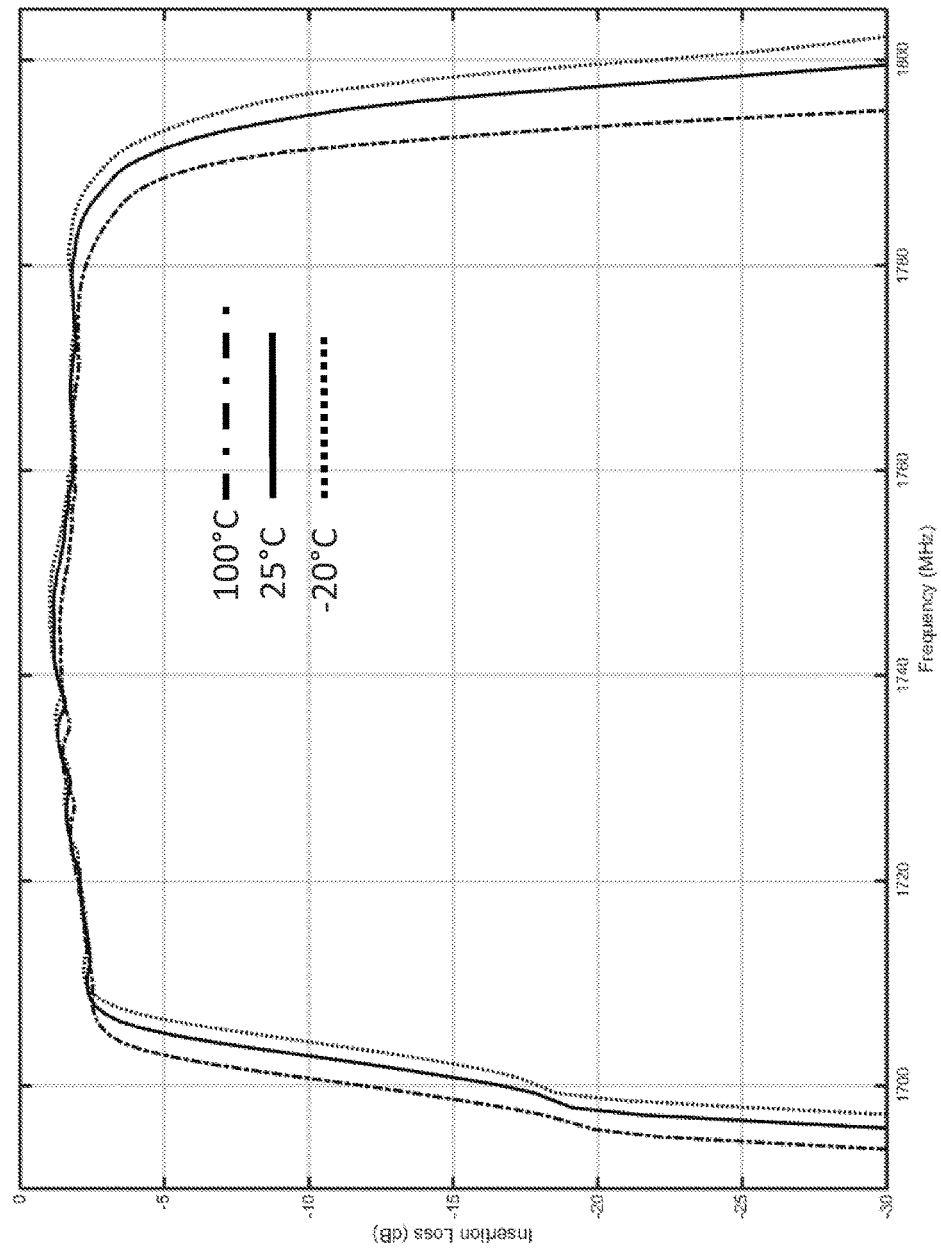
FIG. 1 is a frequency response plot comparing the pass band of an acoustic filter circuit design simulated at different operating temperatures.
Figure 2:
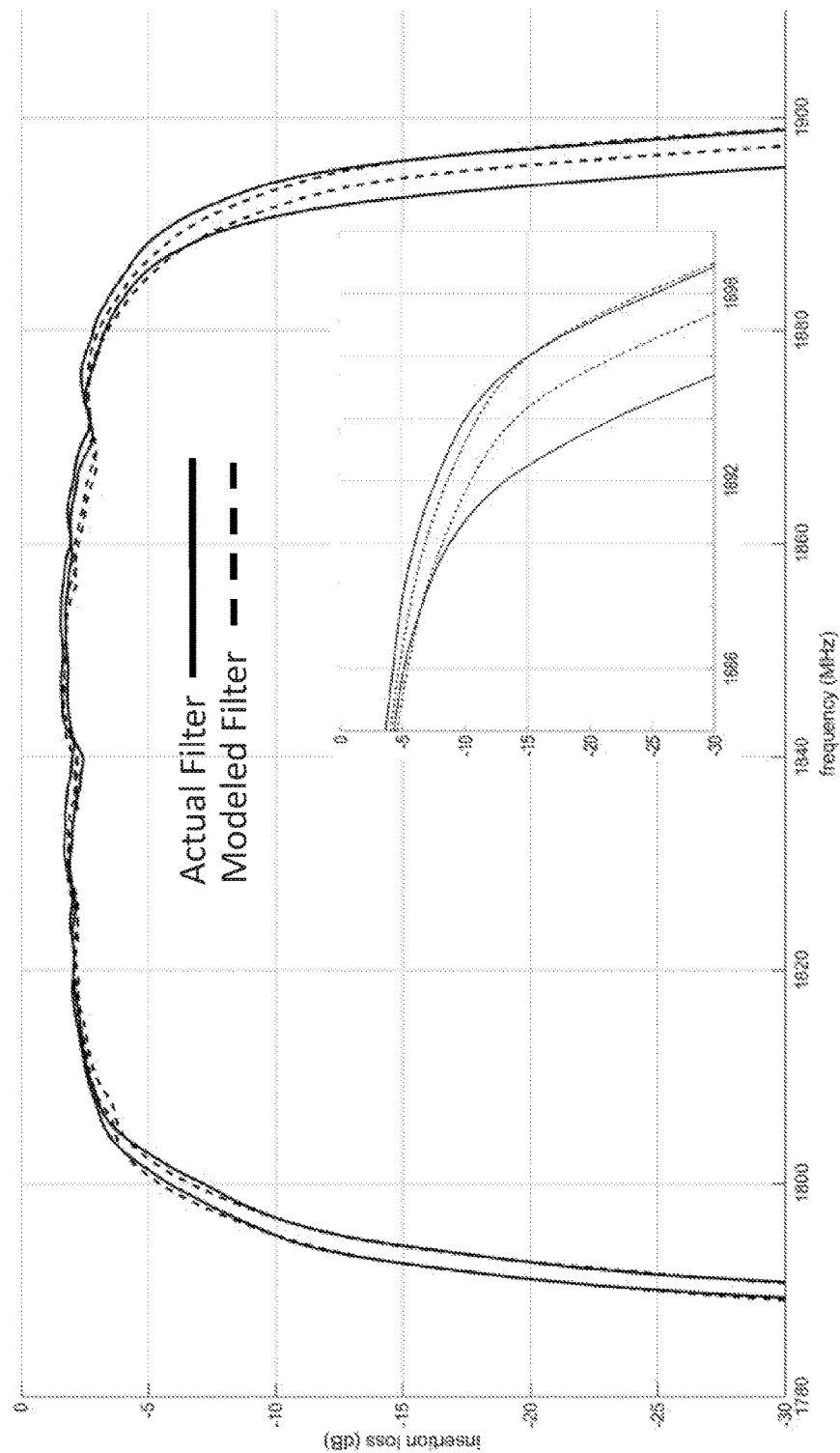
FIG. 2 is a frequency response plot comparing the pass band of an acoustic filter circuit design simulated at different operating temperatures to the pass band of an actual acoustic filter measured at the same operating temperatures.

The present disclosure describes a technique for designing acoustic wave (AW) microwave filters (such as surface acoustic wave (SAW), bulk acoustic wave (BAW), film bulk acoustic resonator (FBAR), microelectromechanical system (MEMS) filters)). This technique can be applied to AW microwave filters in the 300 MHz to 300 GHz frequency range, particularly in the 300 MHz to 10.0 GHz frequency range, and even more particularly in the 500 MHz to 3.5 GHz frequency range. Such AW microwave filters may be either fixed frequency and/or tunable filters (tunable in frequency and/or bandwidth and/or input impedance and/or output impedance), and may be used for single band or multiple band bandpass filtering and/or bandstop. Such AW microwave filters are advantageous in applications that have demanding electrical and/or environmental performance requirements and/or severe cost/size constraints, such as those found in the radio frequency (RF) frontends of mobile communications devices, including cellphones, smartphones, laptop computers, tablet computers, etc. or the RF front ends of fixed communications devices, including M2M devices, wireless base stations, satellite communications systems, etc.

Example AW microwave filters described herein exhibit a frequency response with a single passband, which is particularly useful in telecommunication system duplexers. For example, with reference to FIG. 3, a telecommunications system 10 for use in a mobile communications device may include a transceiver 12 capable of transmitting and receiving wireless signals, and a controller/processor 14 capable of controlling the functions of the transceiver 12. The transceiver 12 generally comprises a broadband antenna 16, a duplexer 18 having a transmit filter 24 and a receive filter 26, a transmitter 20 coupled to the antenna 16 via the transmit filter 24 of the duplexer 18, and a receiver 22 coupled to the antenna 16 via the receive filter 26 of the duplexer 18.

The transmitter 20 includes an upconverter 28 configured for converting a baseband signal provided by the controller/processor 14 to a radio frequency (RF) signal, a variable gain amplifier (VGA) 30 configured for amplifying the RF signal, a bandpass filter 32 configured for outputting the RF signal at an operating frequency selected by the controller/processor 14, and a power amplifier 34 configured for amplifying the filtered RF signal, which is then provided to the antenna 16 via the transmit filter 24 of the duplexer 18.

The receiver 22 includes a notch or stopband filter 36 configured for rejecting transmit signal interference from the RF signal input from the antenna 16 via the receiver filter 26, a low noise amplifier (LNA) 38 configured for amplifying the RF signal from the stop band filter 36 with a relatively low noise, a bandpass filter 40 configured for outputting the amplified RF signal at a frequency selected by the controller/processor 14, and a downconverter 42 configured for downconverting the RF signal to a baseband signal that is provided to the controller/processor 14. Alternatively, the function of rejecting transmit signal interference performed by the stop-band filter 36 can instead be performed by the duplexer 18. Or, the power amplifier 34 of the transmitter 20 can be designed to reduce the transmit signal interference.

Figure 3:
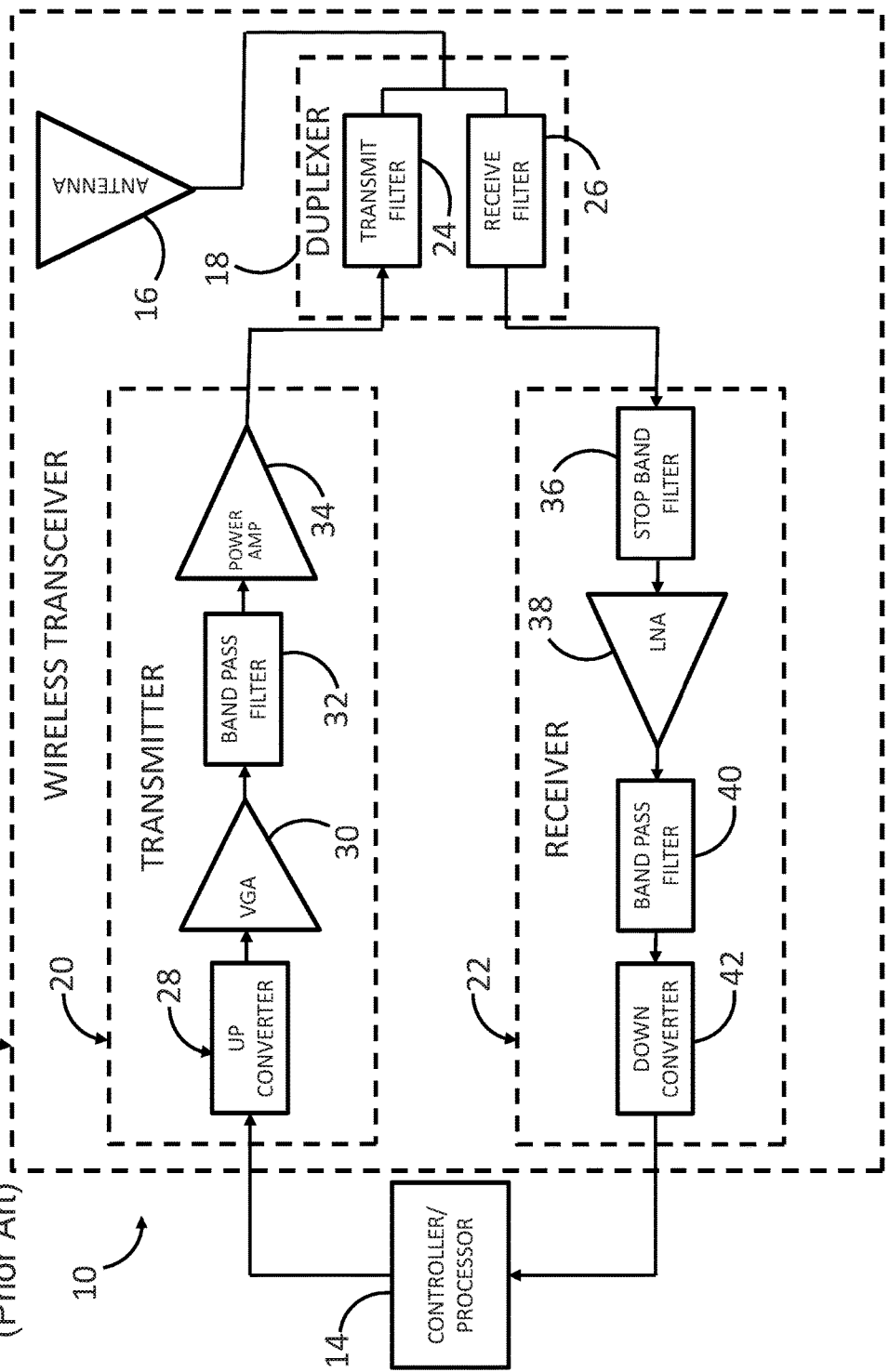
FIG. 3 is a block diagram of a wireless telecommunications system.

It should be appreciated that the block diagram illustrated in FIG. 3 is functional in nature, and that several functions can be performed by one electronic component or one function can be performed by several electronic components. For example, the functions performed by the up converter 28, VGA 30, bandpass filter 40, downconverter 42, and controller/processor 14 are oftentimes performed by a single transceiver chip. The function of the bandpass filter 32 can be performed by the power amplifier 34 and the transmit filter 24 of the duplexer 18.

The exemplary technique described herein is used to design acoustic microwave filters for the front-end of the telecommunications system 10, and in particular the transmit filter 24 of the duplexer 18, although the same technique can be used to design acoustic microwave filters for the receive filter 26 of the duplexer 18 and for other RF filters.

Figure 4:
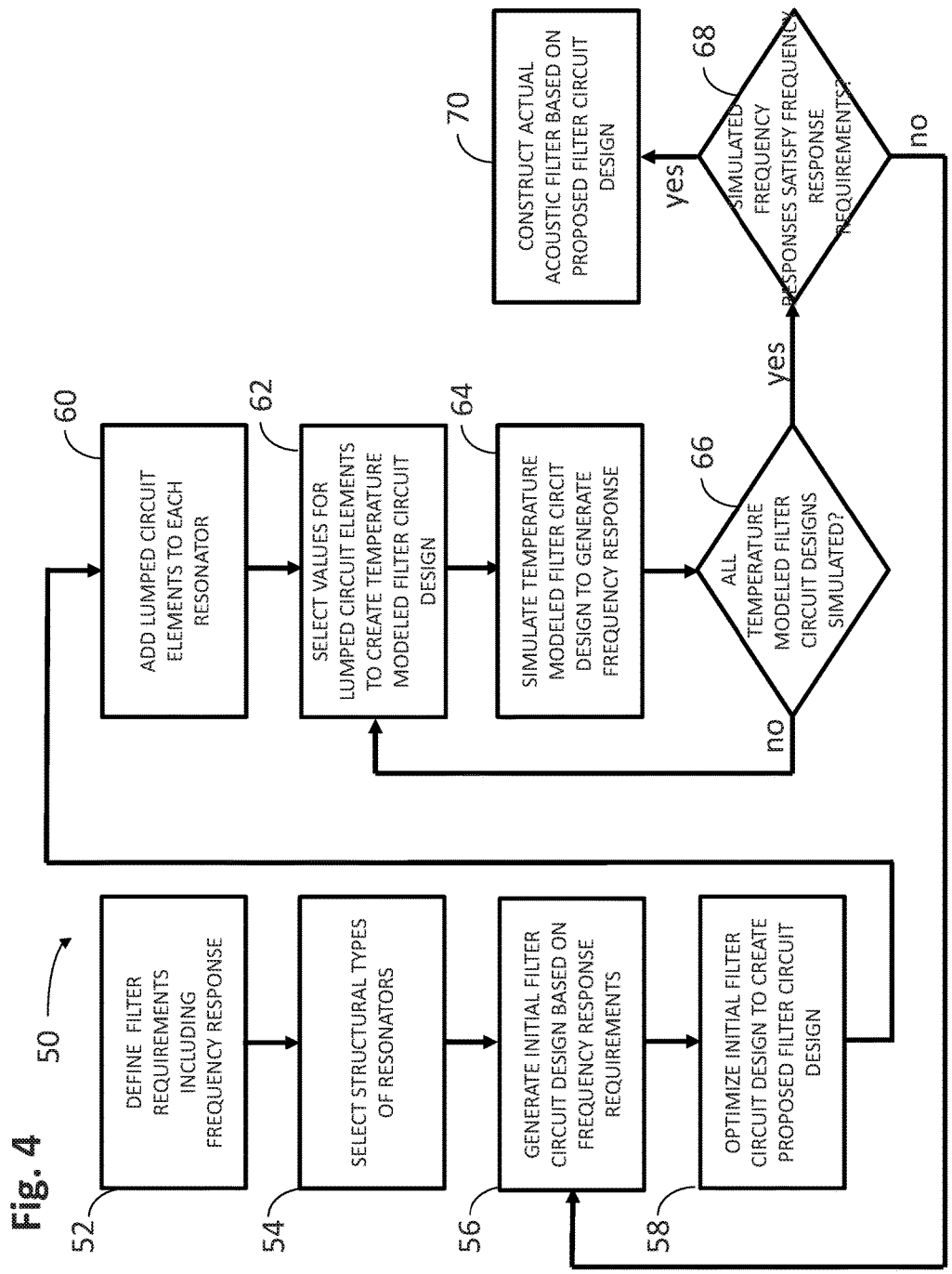
FIG. 4 is a flow diagram of a technique used to design a microwave acoustic filter for use in the wireless telecommunications system of FIG. 3.

Referring now to FIG. 4, one exemplary technique 50 for designing an AW microwave filter will be described. First, the filter requirements, which comprise the frequency response requirements (including passband, return loss, insertion loss, rejection, linearity, noise figure, input and output impedances, etc.), as well as size and cost requirements, and environmental requirements, such as operating temperature range, vibration, failure rate, etc., are established by the application of the filter (step 52).

Next, the structural types of circuit elements to be used in the AW filter are selected; for example, the structural type of resonator (SAW, BAW, FBAR, MEMS, etc.) and the types of inductor, capacitor, and switch, along with the materials to be used to fabricate these circuit elements, including the packaging and assembly techniques for fabricating the filter, are selected (step 54). In the particular example described herein, the selection of circuit element types are SAW resonators and capacitors constructed on a substrate composed of 42-degree XY-cut LiTaO3.

Then, an initial filter circuit design is generated based on the frequency response requirements using a suitable design technique (step 56); for instance, using an image design or network synthesis design, such as those described in U.S. Pat. Nos. 8,701,065 and 9,038,005, which are expressly incorporated herein by reference. In the illustrated embodiment, the proposed filter circuit design has an Nth order ladder topology, such as those described in U.S. Pat. Nos. 8,751,993 and 8,701,065 and U.S. patent application Ser. No. 14/941,451, entitled "Acoustic Wave Filter with Enhanced Rejection", which are all expressly incorporated herein by reference; although other filter topologies, such as in-line non-resonant-node, or in-line, or in-line with cross couplings, or in-line non-resonant node with cross couplings, etc., may be selected.

Figure 5:
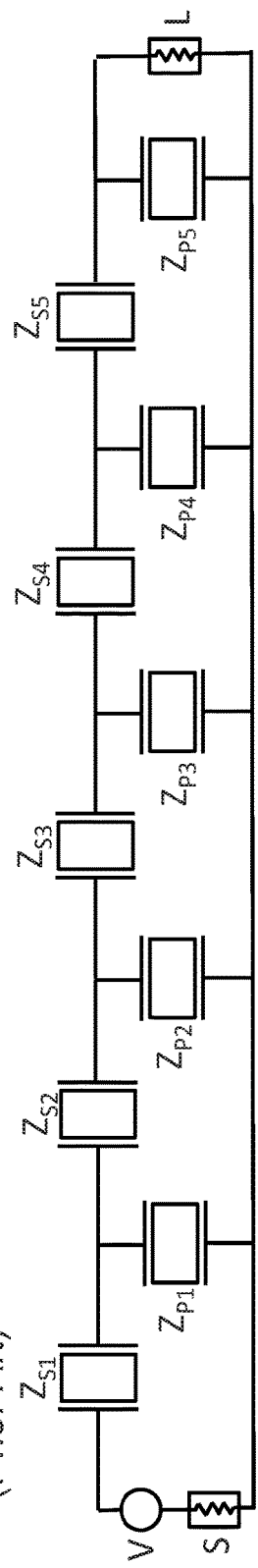
FIG. 5 is a schematic diagram of a conventional microwave acoustic filter arranged in an Nth order ladder topology.

Referring now to FIG. 5, one embodiment of a filter circuit design 100 will be described. The filter circuit design 100 is arranged in an Nth-order ladder topology (i.e., in this case, N=10 meaning the number of resonators equals 10). The filter circuit design 100 comprises a voltage source V, a source resistance S, a load resistance L, five series (or in-line) acoustic resonators $Z_{S1}$-$Z_{S5}$, and five parallel (or in-shunt) acoustic resonators $Z_{P1}$-$Z_{P5}$.

Figure 6:
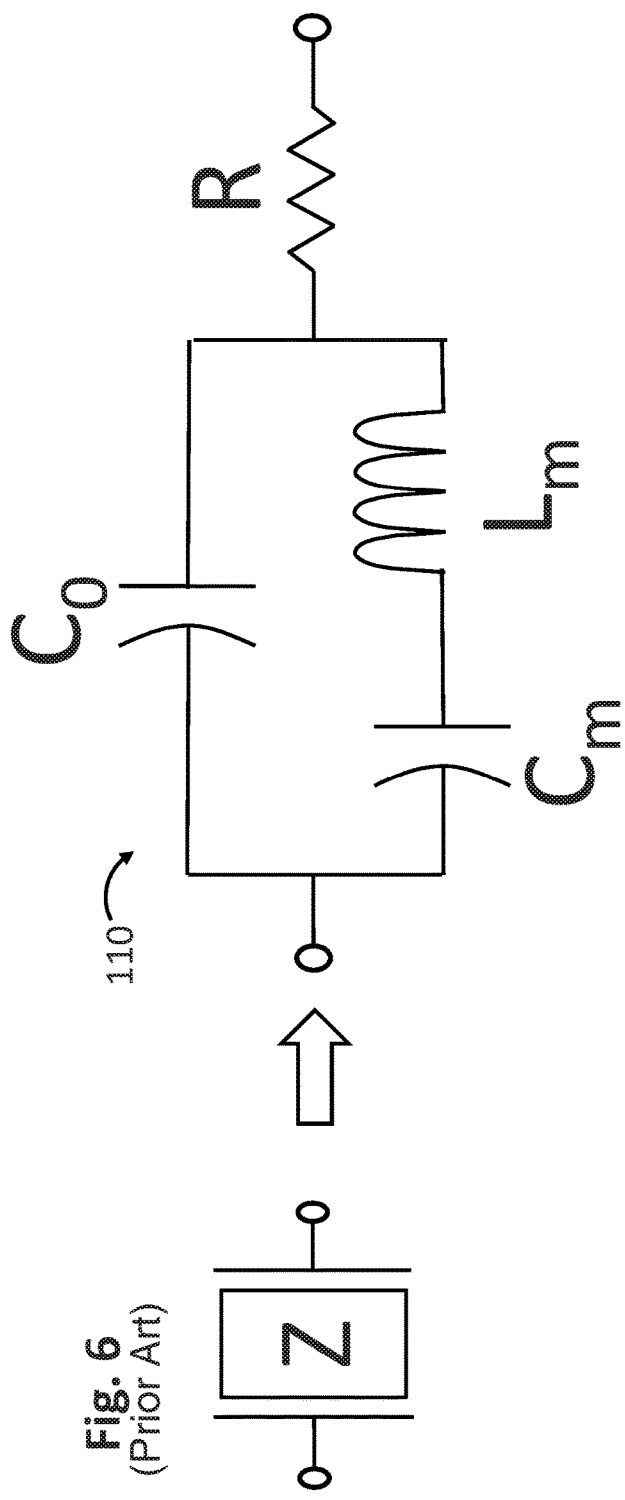
FIG. 6 is a schematic diagram illustrating the transformation of an acoustic resonator of the acoustic filter of FIG. 5 into an equivalent modified Butterworth-Van Dyke (MBVD) model.
Figure 7:
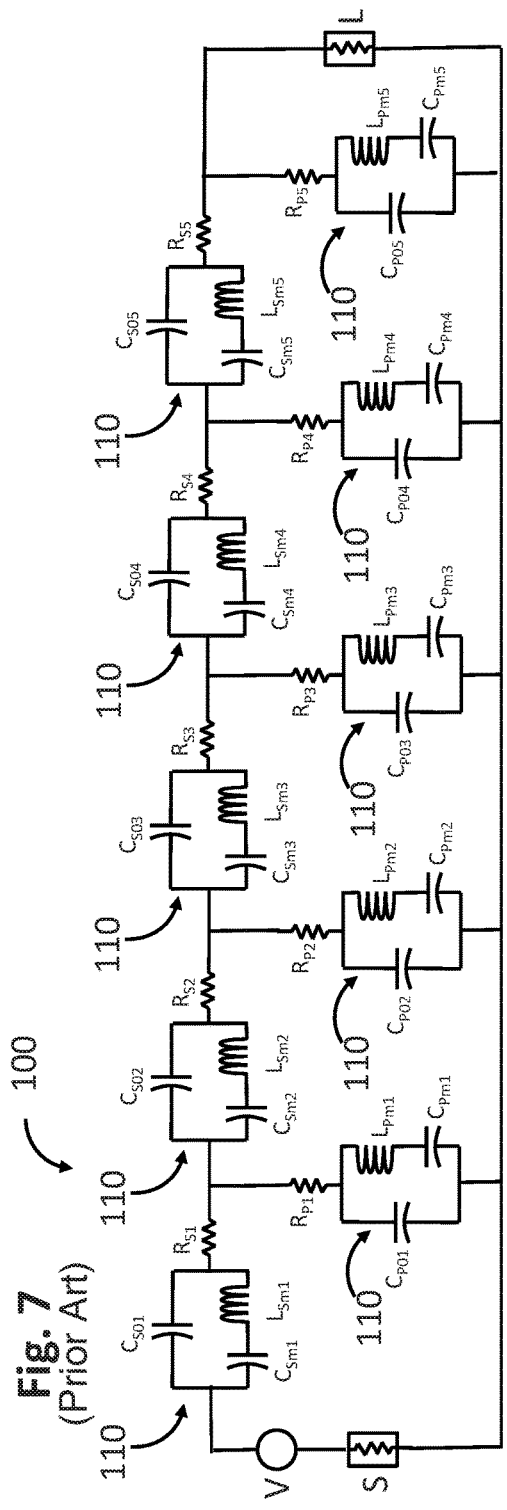
FIG. 7 is a schematic diagram illustrating the MBVD equivalent circuit of the conventional acoustic filter of FIG. 5.

Each of the acoustic resonators Z may be described by a modified Butterworth-Van Dyke (MBVD) model 110 illustrated in FIG. 6, thereby resulting in the equivalent filter circuit design illustrated in FIG. 7. MBVD models 110 may also describe SAW resonators, which may be fabricated by disposing interdigital transducers (IDTs) on a piezoelectric substrate, such as crystalline Quartz, Lithium Niobate ($LiNbO_3$), Lithium Tantalate ($LiTaO_3$) crystals or BAW (including FBAR) resonators or MEMS resonators. Each MBVD model 110 includes a motional capacitance $C_m$, a static capacitance $C_0$, a motional inductance $L_m$, and a resistance R. The motional capacitance $C_m$ and motional inductance $L_m$ may result from the interactions of electrical and acoustical behavior, and thus, may be referred to as the motional arm of the MBVD model. The static capacitance $C_0$ may result from the capacitance of the structure, and thus, may be referred to as the static (non-motional) capacitance of the MBVD model. The resistance R may result from the electrical resistance of the acoustic resonator. Alternatively, rather than using an MBVD model, the acoustic resonator may be an arbitrary one-port impedance produced by other types of suitable models, such as a Coupling-of-Modes (COM) model or Finite Element Model (FEM).

The parameters of the MBVD model 110 are related by the following equations:

$$\omega_R = \frac{1}{\sqrt{L_m C_m}}; \quad [1]$$

$$\frac{\omega_A}{\omega_R} = \sqrt{1 + \frac{1}{\gamma}}, \quad [2]$$

where $\omega_R$ and $\omega_A$ may be the respective resonance and anti-resonance frequencies for any given acoustic resonator, and gamma $\gamma$ may depend on a material's property, which may be further defined by:

$$\frac{C_0}{C_m} = \gamma. \quad [3]$$

Typical $\gamma$ values may range from about 12 to about 18 for 42-degree X Y cut $LiTaO_3$. The frequency separation of an acoustic resonator means the difference between its resonant frequency and its anti-resonant frequency. The percentage separation of an acoustic wave resonator is the percentage frequency separation between its resonant frequency and anti-resonant frequency, and can be computed, as follows:

$$\text{percentage separation} = \sqrt{1 + (1/\gamma)} - 1 \quad [4]$$

where $\gamma$ is the ratio of the static to the motional capacitance of the resonator (equation [3]), as determined by the material properties of the piezoelectric material and modified by the geometry of the device.

It can be appreciated from equation [1] that the resonant frequency of each of the acoustic resonators will depend on the motional arm of the BVD model 110, whereas the filter characteristics (e.g., bandwidth) will be strongly influenced by γ in equation [2]. The Quality factor (Q) for an acoustic resonator 110 may be an important figure of merit in acoustic filter design, relating to the loss of the element within the filter. Q of a circuit element represents the ratio of the energy stored per cycle to the energy dissipated per cycle. The Q factor models the real loss in each acoustic resonator, and generally more than one Q factor may be required to describe the loss in an acoustic resonator. Q factors may be defined as follows for the filter examples. The motional capacitance $C_m$ may have an associated Q defined as $Q_{cm}=10^8$; the static capacitance $C_0$ may have an associated Q defined as $Q_{c0}=200$; and motional inductance $L_m$ may have an associated Q defined as $Q_{Lm}=1000$. (Here for simplicity the loss in the motional resonance is lumped into the motional inductance and the motional capacitance is considered to be essentially loss-less.) Circuit designers may typically characterize SAW resonators by resonant frequency $\omega_R$, static capacitance $C_0$, gamma γ, and Quality factor $QL_m$. For commercial applications, $QL_m$ may be about 1000 for SAW resonators, and about 3000 for BAW resonators.

Referring back to FIG. 4, the filter circuit design 100 is next optimized via a suitable computer optimization technique to search for the combination of circuit element values that best matches the desired filter response, thereby creating a proposed filter circuit design having defined values for all of the circuit elements, including admittance values for the acoustic resonators Z (step 58). Design tools, including Agilent Advanced Design System (ADS), among others, may use numerical optimization methods, such as Monte Carlo, gradient, etc., to improve the proposed filter circuit design. In one embodiment, one or more circuit elements in the proposed filter circuit design can be removed during the optimization process, such as disclosed in U.S. Pat. No. 8,751,993, which has been expressly incorporated herein by reference.

Figure 9:
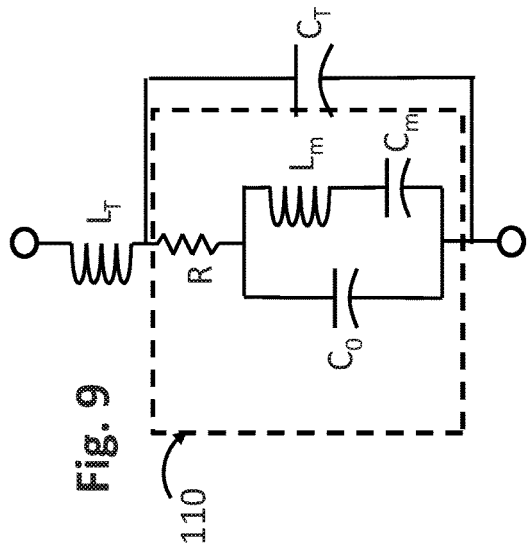
FIG. 9 is a schematic diagram illustrating the transformation of the temperature modeled acoustic resonator of FIG. 8 into an equivalent modified Butterworth-Van Dyke (MBVD) model.
Figure 8:
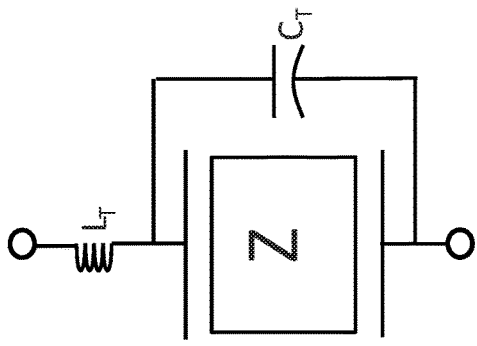
FIG. 8 is a schematic diagram illustrating an acoustic resonator having temperature compensating lumped circuit elements.

The effects of temperature variations on the proposed filter circuit design can be simulated by adding two discrete components to each acoustic resonator Z in the filter: a series inductor to shift the resonant frequency of the respective acoustic resonator Z, and a parallel capacitor to shift the anti-resonant frequency of the respective acoustic resonator Z. In particular, a lumped capacitive element $C_T$ is introduced in parallel and a lumped inductive element $L_T$ is introduced in series with each acoustic resonator Z of the proposed filter circuit design (FIG. 8) to create a temperature modeled filter circuit design 200, as illustrated in FIG. 10 (step 60). As illustrated in FIG. 9, each of the acoustic resonators Z of the temperature modeled filter design 200 can be replaced with the MBVD model 110 illustrated in FIG. 6.

Next, a selected number of temperature modeled circuit designs corresponding to different operating temperatures (e.g., three operating temperatures of 0° C., 20° C., and 100° C.) are created and simulated by varying the capacitance values for the capacitive elements $C_T$ and inductance values for the inductive elements $L_T$ for each respective operating temperature to be simulated. The capacitance values and inductances values for each operating temperature can be computed as a function of that operating temperature. In one embodiment, the capacitance value for each capacitive element $C_T$ and the inductance value for each inductive element $L_T$ are computed in accordance with the following equations:

$$C_{Tn}=k_C \cdot A_n \cdot (T_{op}-T_{base}), \quad [6]$$

where $C_{Tn}$ is the capacitance value of the nth acoustic resonator in the temperature modeled filter circuit design, $k_C$ is a scaling constant for the capacitive elements, $A_n$ is the area of the nth acoustic resonator, $T_{op}$ is the operating temperature, and $T_{base}$ is a baseline temperature at which it is assumed that $C_{Tn}$ equals zero (e.g., room temperature); and $$L_{Tn}=k_L \cdot (T_{op}-T_{base}), \quad [7]$$

where $L_{Tn}$ is the inductance value of the nth acoustic resonator in the temperature modeled filter circuit design, $k_L$ is a scaling constant for the inductive elements, $T_{op}$ is the operating temperature, and $T_{base}$ is a baseline temperature at which it is assumed that $L_{Tn}$ equals zero (e.g., room temperature).

To this end, capacitance values for the capacitive elements $C_T$ and inductance values for the respective inductive elements $L_T$ are selected, thereby creating a temperature modeled filter circuit design that shifts the defined admittance values of the respective acoustic resonators Z to different admittance values (step 62). As a general rule, the inductance values for all of the inductive elements $L_T$ will be the same, whereas the capacitance values for all of the capacitive elements $C_T$ will be the same only if the areas of the acoustic resonators Z are the same. The temperature modeled filter circuit design is then simulated at a defined operating temperature, thereby generating a frequency response (step 64). The first and second capacitance values may be, e.g., in the range of −40 pF-40 pF, and more specifically in the range of −4 pF-4 pF, and the first and second inductance values may be, .e.g., in the range of −10 nH-10 nH, and more specifically in the range of −1 nH-1 nH.

Additional temperature modeled filter circuit designs corresponding to different operating temperatures can be created by selecting different capacitance values and inductance values. In particular, if not all the selected number of operating temperatures have been simulated (i.e., if not all of the temperature modeled filter circuit designs have been simulated) (step 66), different capacitance values for the capacitive elements $C_T$ and inductance values for the respective inductive elements $L_T$ are selected, thereby creating another temperature modeled filter circuit design that shifts the defined admittance values of the respective acoustic resonators Z to different admittance values (step 62), and then the other temperature modeled filter circuit design is simulated at another defined operating temperature, thereby generating a frequency response (step 64). This process is repeated until all of the temperature modeled filter circuit designs have been simulated. If the simulated frequency responses of the temperature modeled filter circuit designs do not satisfy the frequency response requirements at the defined operating temperatures (step 68), a different initial filter circuit design may be generated and optimized to create another proposed filter circuit design (steps 56 and 58) and then, temperature modeled filter circuit designs can be generated from the other proposed filter circuit design and simulated (steps 60-66). Once the simulated frequency responses of the temperature modeled filter circuit designs satisfy the frequency response requirements at the defined operating temperatures (step 68), an actual acoustic filter is constructed based on the most recent proposed filter circuit design (step 70). Preferably, the circuit element values of the actual acoustic filter will match the corresponding circuit element values in the most recent proposed filter circuit design.

Figure 11:
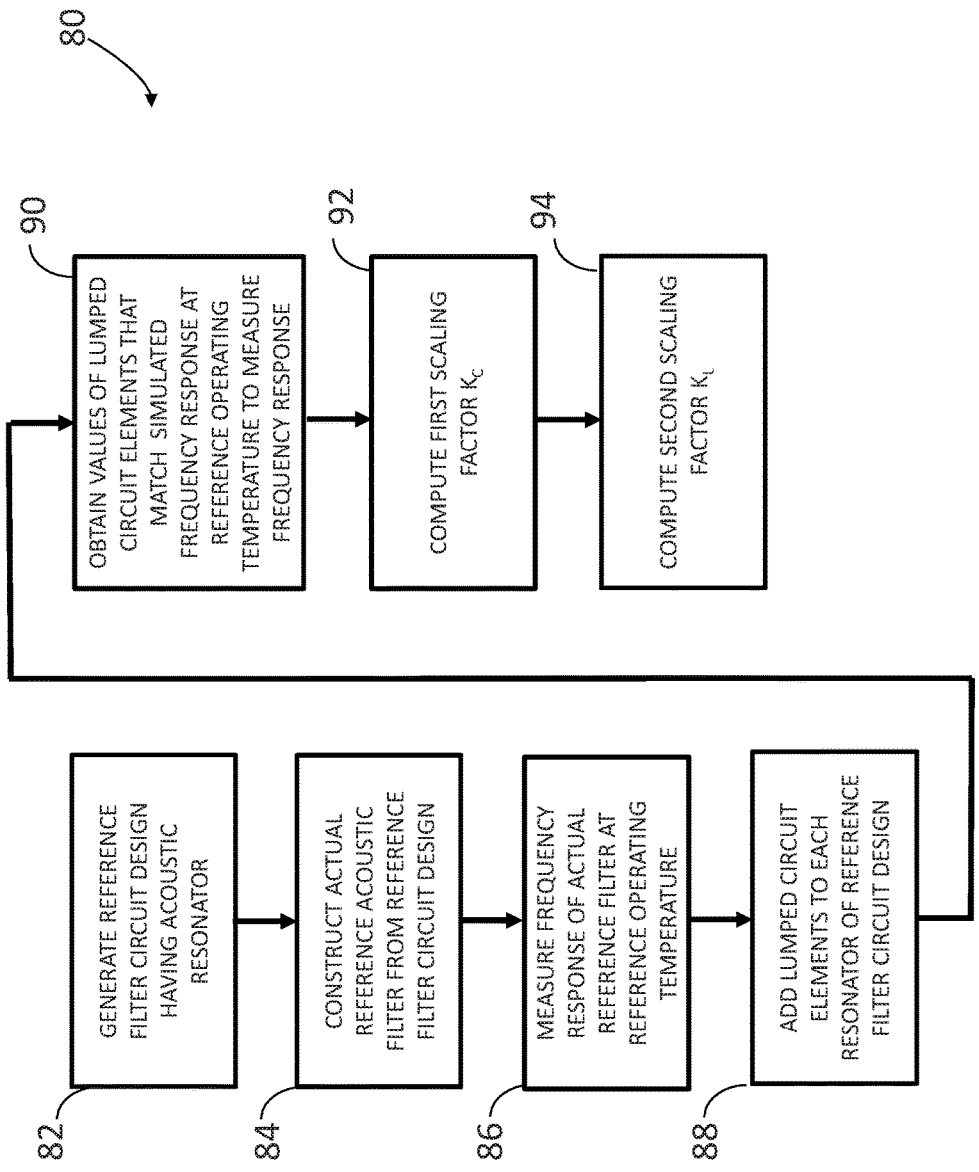
FIG. 11 is a flow diagram illustrating a technique for computing scaling factors for the temperature modeled lumped circuit elements.

The scaling factors $k_C$ and $k_L$ of equations [6] and [7] can be determined by measuring the frequency responses of an actual acoustic filter and fitting data of simulated temperature-compensated filter circuits to the frequency responses of the actual acoustic filter. In particular, with reference to FIG. 11, one technique 80 for determining the scaling factors $k_C$ and $k_L$ will now be described. First, a reference filter circuit design having a plurality circuit elements comprising at least one acoustic resonator is generated (step 82), and then, an actual reference acoustic microwave filter is constructed from the reference filter circuit design (step 84). The acoustic resonator(s) of this reference filter are composed of the same material as the acoustic resonators of the proposed filter circuit design 100, so that the scaling factors determined from the reference filter can be accurately used to generate the temperature modeled filter designs 200 from the proposed filter circuit design 100. Next, a reference frequency response of the actual reference filter is measured at a reference (e.g., room temperature) (step 86).

Each of the first and second scaling factors $k_C$ and $k_L$ is then computed based on the first reference frequency response. In particular, a lumped reference capacitive element is added in parallel and a lumped reference inductive element is added in series with each of the reference acoustic resonator(s) in a similar manner as the capacitive element(s) and inductive elements(s) are added to the proposed filter circuit design 100 in FIG. 5, thereby generating a reference temperature modeled filter circuit design (step 88).

Then, the capacitance value of the reference capacitive element(s) and the reference inductance value of the reference inductive elements(s) that match the simulated frequency response of the temperature modeled reference filter circuit design at the reference operating temperature to the measured frequency response of the actual reference acoustic filter is determined (step 90). For example, the temperature modeled reference filter circuit design can be iteratively simulated at the reference operating temperature while changing the capacitance value of the reference capacitive element(s) and the reference inductance value of the reference inductive element(s) until the frequency response of the simulated temperature modeled reference filter circuit design matches the measured frequency response of the reference acoustic microwave filter at the reference operating temperature, thereby arriving at a first reference capacitance value $C_{REF1}$ and a first reference inductance value $L_{REF1}$.

The first scaling factor $k_C$ is then computed in accordance with the following equation (step 92):

$$k_C = \frac{C_{REF}}{A \cdot (T_{REF} - T_{base})}, \quad [8]$$

where $k_C$ is the first scaling factor, $C_{REF}$ is the reference capacitance value, A is the area of the reference acoustic resonator, $T_{REF}$ is the reference operating temperature, and $T_{base}$ is the baseline operating temperature (e.g., room temperature); and
the second scaling factor $k_L$ is then computed in accordance with the following equation (step 94):

$$k_L = \frac{L_{REF}}{(T_{REF} - T_{base})}, \quad [9]$$

where $k_L$ is the second scaling factor, $L_{REF}$ is the reference inductance value, $T_{REF}$ is the reference operating temperature, and $T_{base}$ is the baseline operating temperature.

It should be appreciated that additional scaling factors may be computed for different operating temperature ranges. For example, a first set of scaling factors $k_{C1}$ and $k_{L1}$ can be associated with the temperature range 0° C.-50° C., and a second set of scaling factors $k_{C2}$ and $k_{L2}$ can be associated with the temperature range 50° C.-100° C. The first set of scaling factors $k_{C1}$ and $k_{L1}$ can be determined by measuring the frequency response of the reference filter in accordance with equations [8] and [9] using, e.g., 25° C. as the reference operating temperature; and the second set of scaling factors $k_{C2}$ and $k_{L2}$ can be determined by measuring frequency responses of the reference filter at two reference operating temperatures (e.g., 50° C. and 100° C.), iteratively simulating the temperature modeled reference filter circuit design at the first reference temperature while changing the capacitance value of the reference capacitive element(s) and the reference inductance value of the reference inductive element(s) until the frequency response of the simulated temperature modeled reference filter circuit design matches the measured frequency response of the reference acoustic microwave filter at the first reference operating temperature, thereby arriving at a first reference capacitance value $C_{REF1}$ and a first reference inductance value $L_{REF1}$, and iteratively simulating the temperature modeled reference filter circuit design at the second reference temperature while changing the capacitance value of the reference capacitive element(s) and the reference inductance value of the reference inductive element(s) until the frequency response of the simulated temperature modeled reference filter circuit design matches the measured frequency response of the reference acoustic microwave filter at the second reference temperature, thereby arriving at a second reference capacitance value $C_{REF2}$ and a second reference inductance value $L_{REF1}$.

The scaling factor $k_{C2}$ is then computed in accordance with the following equation:

$$k_C = \frac{C_{REF2} - C_{REF1}}{A \cdot (T_{REF2} - T_{REF1})}, \quad [10]$$

where $k_C$ is the scaling factor, $C_{REF2}$ is the second reference capacitance value, $C_{REF1}$ is the first reference capacitance value, A is the area of the reference acoustic resonator, $T_{REF2}$ is the second reference operating temperature (e.g., 100° C.), and $T_{REF1}$ is the first reference operating temperature (e.g., 50° C.).

The scaling factor $k_{L2}$ is then computed in accordance with the following equation:

$$k_L = \frac{L_{REF2} - L_{REF1}}{(T_{REF2} - T_{REF1})}, \quad [11]$$

where $k_L$ is the scaling factor, $L_{REF2}$ is the second reference inductance value, $L_{REF1}$ is the first reference inductance value, $T_{REF2}$ is the second reference operating temperature (e.g., 100° C.), and $T_{REF1}$ is the first reference operating temperature (e.g., 50° C.).

Figure 12:
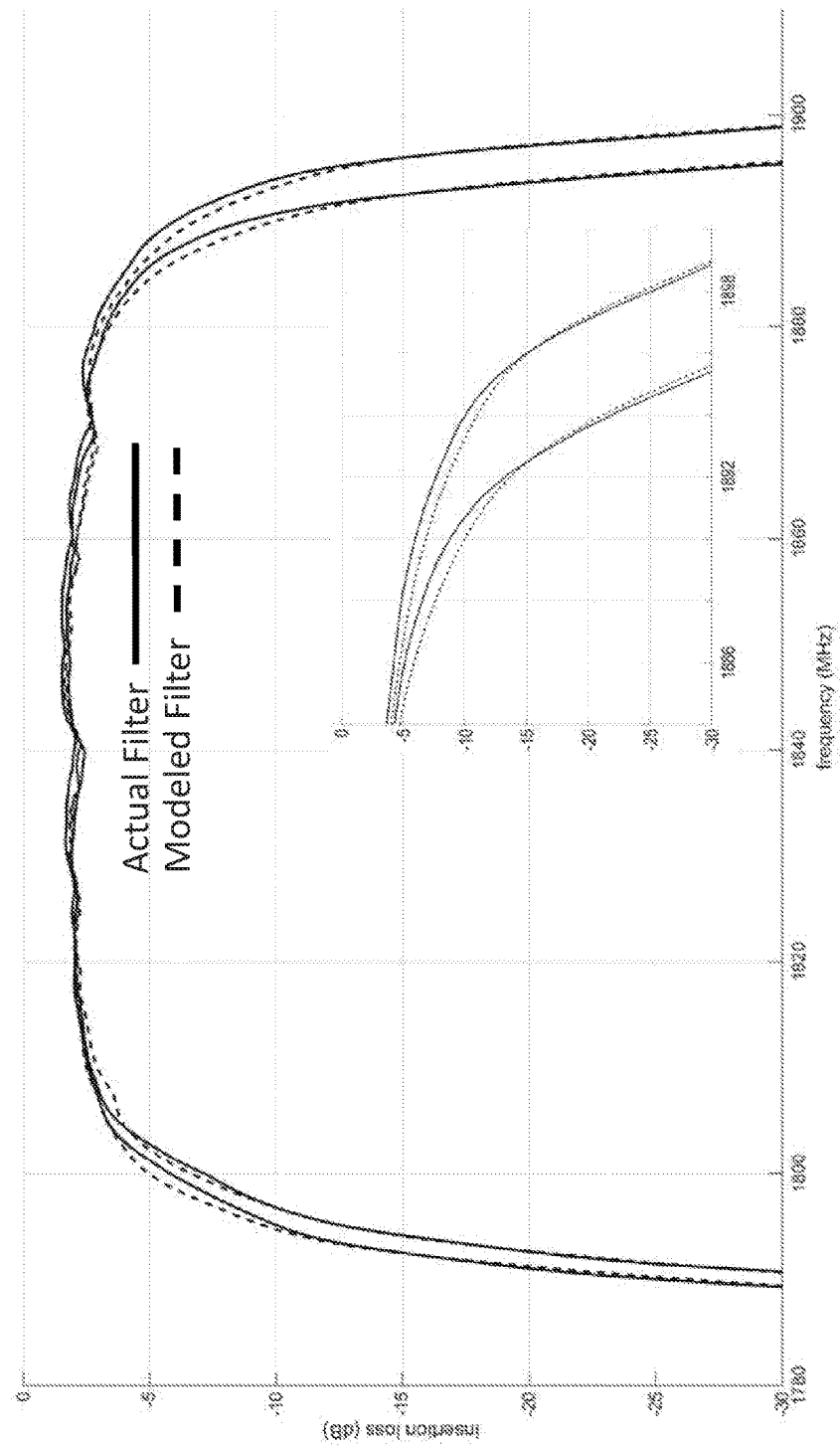
FIG. 12 is a frequency response plot comparing the pass band of an acoustic filter circuit design designed in accordance with the technique illustrated in FIG. 4 to the pass band of an actual acoustic filter constructed from the acoustic filter circuit design.

The acoustic microwave filter design illustrated in FIG. 5 was optimized in accordance with the technique illustrated in FIG. 4, and then an actual acoustic microwave filter was constructed from the optimized acoustic microwave filter design. Referring to FIG. 12, the frequency responses of the acoustic microwave filter design simulated at −20° C. and 100° C. (dashed lines) can be compared to the frequency responses of the corresponding actual acoustic microwave filter measured at −20° C. and 100° C. (solid lines). It can be readily seen that the left and right sides of the passbands of the simulated frequency responses at −20° C. and 100° C. respectively match the left and right sides of the passbands of the actual frequency responses at −20° C. and 100° C.

Figure 13:
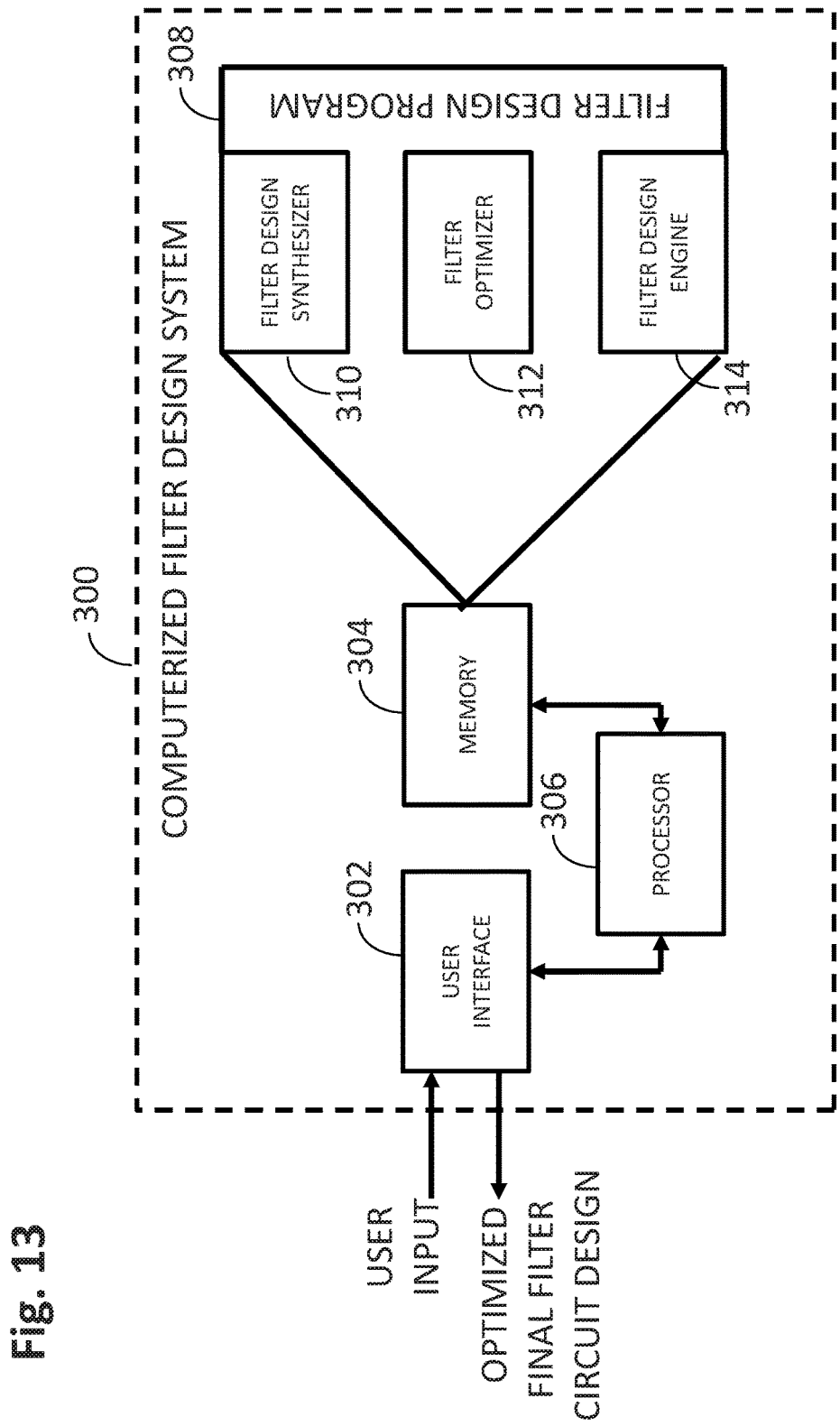
FIG. 13 is a block diagram of a computerized filter design system that can implement the computerized steps of the filter design technique of FIG. 4.

Referring first to FIG. 13, a computerized filter design system 300 may be used to design an acoustic filter using the design technique 50. The computerized filter design system 300 generally comprises a user interface 302 configured for receiving information and data from a user (e.g., parameter values and filter specifications at steps 52 and 54) and outputting an optimized filter circuit design to the user; a memory 304 configured for storing filter design software 308 (which may take the form of software instructions, which may include, but are not limited to, routines, programs, objects, components, data structures, procedures, modules, functions, and the like that perform particular functions or implement particular abstract data types), as well as the information and data input from the user via the user interface 302; and a processor 306 configured for executing the filter design software. The filter design software program 308 is divided into sub-programs, in particular, a conventional filter design synthesizer 310 (which can be used to generate the initial filter circuit design at step 56), a conventional filter optimizer 312 (which can be used to optimize and simulate the filter design at steps 58 and 64), and a filter design engine 314 that controls the design synthesizer 310 and filter optimizer 312 and adds and determines the values of the lumped capacitive and inductive elements at steps 60 and 62 in order to generate the optimized final circuit design.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. For example, the present invention has applications well beyond filters with a single input and output, and particular embodiments of the present invention may be used to form duplexers, multiplexers, channelizers, reactive switches, etc., where low-loss selective circuits may be used. Thus, the present invention is intended to cover alternatives, modifications, and equivalents that may fall within the spirit and scope of the present invention as defined by the claims.

What is claimed is:

1. A method of designing an acoustic microwave filter in accordance with frequency response requirements, comprising:
    generating a proposed filter circuit design having a plurality of circuit elements comprising an acoustic resonant element having a defined admittance value;
    introducing a lumped capacitive element in parallel and a lumped inductive element in series with the acoustic resonant element;
    selecting a capacitance value for the lumped capacitive element and an inductance value for the lumped inductive element, thereby creating a temperature modeled filter circuit design that shifts the defined admittance value of the acoustic resonant element to an admittance value;
    simulating the temperature modeled filter circuit design at an operating temperature, thereby generating a frequency response;
    comparing the frequency response to the frequency response requirements; and
    constructing the acoustic microwave filter from the proposed filter circuit design based on the comparison.

2. The method of claim 1, wherein the frequency response requirements comprise one or more of a frequency dependent return loss, insertion loss, rejection, and linearity.

3. The method of claim 1, wherein the acoustic resonant element is one of a surface acoustic wave (SAW) resonator, a bulk acoustic wave (BAW) resonator, a film bulk acoustic resonator (FBAR), and a microelectromechanical system (MEMS) resonator.

4. The method of claim 1, wherein the frequency response requirement comprises a pass band.

5. The method of claim 4, wherein the passband is in the 500-3500 MHz range.

6. The method of claim 4, wherein the passband is in the 300 MHz to 10.0 GHz range.

7. The method of claim 4, wherein the passband is in the 300 MHz to 300 GHz range.

8. The method of claim 1, wherein the frequency response requirements comprise a passband and a stopband.

9. The method of claim 1, further comprising modeling the acoustic resonant element as a Butterworth-Van Dyke (BVD) model.

10. The method of claim 1, further comprising modeling the acoustic resonant element with a Coupling of Modes (COM) model.

11. The method of claim 1, further comprising modeling the acoustic resonant element with a Finite Element Model (FEM).

12. The method of claim 1, wherein the proposed filter circuit design has an Nth order ladder topology.

13. The method of claim 1, wherein the capacitance value and the inductance value are computed as functions of the operating temperature.

14. The method of claim 13, wherein the capacitance value is selected to be equal to the product of a first scaling factor, the area of the acoustic resonant element of the proposed filter circuit design, and the difference between the operating temperature and a baseline temperature, and the inductance value is selected to be equal to the product of a second scaling factor and the difference between the operating temperature and the baseline temperature.

15. The method of claim 14, further comprising:
    generating a reference filter circuit design having a plurality of circuit elements comprising a reference acoustic resonant element;
    constructing a reference acoustic microwave filter from the reference filter circuit design, the reference resonant element being composed of a first material, and the acoustic resonant element of the proposed filter circuit design being composed of a second material the same as the first material;
    measuring a reference frequency response of the reference acoustic microwave filter at a reference operating temperature; and
    computing each of the first and second scaling factors based on the reference frequency response.

16. The method of claim 15, further comprising:
    introducing a lumped reference capacitive element in parallel and a lumped reference inductive element in series with the reference resonant element;

selecting a reference capacitance value for the lumped reference capacitive element and a reference inductance value for the lumped reference inductive element, thereby generating a temperature modeled reference filter circuit design;

iteratively simulating the temperature modeled reference filter circuit design at the reference operating temperature while changing the reference capacitance value and the reference inductance value until a frequency response of the simulated reference filter circuit design matches the measured frequency response of the temperature modeled reference acoustic microwave filter at the reference operating temperature, thereby arriving at a final reference capacitance value and a final reference inductance value.

17. The method of claim 16, wherein the first scaling factor equals the final reference capacitance value divided by the product of the area of the reference resonant element and the difference between the reference operating temperature and a baseline operating temperature, and the second scaling factor equals the final reference inductance value divided by the difference between the reference operating temperature and the baseline operating temperature.

18. The method of claim 1, wherein the capacitance value is in the range of range of −40 pF-40 pF.

19. The method of claim 1, wherein the capacitance value is in the range of range of −4 pF-4 pF.

20. The method of claim 1, wherein the inductance value is in the range of −10 nH-10 nH.

21. The method of claim 1, wherein the inductance value is in the range of −1 nH-1 nH.

22. The method of claim 1, further comprising optimizing the proposed filter circuit design, wherein the lumped capacitive element and lumped inductive element are introduced into the proposed optimized filter circuit design.

* * * * *